(12) United States Patent
Takaki et al.

(10) Patent No.: US 10,591,935 B2
(45) Date of Patent: Mar. 17, 2020

(54) SUBSTRATE LIQUID PROCESSING APPARATUS AND SUBSTRATE LIQUID PROCESSING METHOD

(71) Applicant: Tokyo Electron Limited, Tokyo (JP)

(72) Inventors: Yasuhiro Takaki, Kumamoto (JP); Hiroshi Komiya, Kumamoto (JP); Chikara Nobukuni, Kumamoto (JP); Keigo Satake, Kumamoto (JP); Atsushi Anamoto, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 16/188,525

(22) Filed: Nov. 13, 2018

(65) Prior Publication Data

US 2019/0079544 A1 Mar. 14, 2019

Related U.S. Application Data

(62) Division of application No. 14/536,989, filed on Nov. 10, 2014, now Pat. No. 10,162,371.

(30) Foreign Application Priority Data

Nov. 13, 2013 (JP) .................................. 2013-235304
Oct. 3, 2014 (JP) .................................. 2014-205113

(51) Int. Cl.
*G05D 11/13* (2006.01)
(52) U.S. Cl.
CPC .................................. *G05D 11/138* (2013.01)

(58) Field of Classification Search
CPC .................................................... G05D 11/138
See application file for complete search history.

(56) References Cited

U.S. PATENT DOCUMENTS

| 2,815,270 A | 7/1945 | Laurence et al. |
| 8,770,198 B2 | 6/2014 | Yee et al. |
| 2002/0146251 A1 | 10/2002 | Nakagawa et al. |
| 2009/0141583 A1 | 6/2009 | Fanjet et al. |
| 2011/0023912 A1 | 2/2011 | Matsmoto |

(Continued)

FOREIGN PATENT DOCUMENTS

| JP | 10-154682 A | 6/1998 |
| JP | 2002-324753 A | 11/2002 |

(Continued)

*Primary Examiner* — Queenie S Dehghan
(74) *Attorney, Agent, or Firm* — Abelman, Frayne & Schwab

(57) ABSTRACT

A substrate liquid processing apparatus includes a tank; a circulation line; a processing unit connected to the circulation line through a branch line and configured to perform a liquid processing on a substrate using a processing liquid flowing through the circulation line; a processing liquid producing mechanism configured to produce the processing liquid by mixing at least two kinds of raw material liquids supplied from respective raw material liquid sources at a controlled mixing ratio; a concentration measuring device configured to measure a concentration of the processing liquid flowing through the circulation line and a concentration of the processing liquid flowing through the processing liquid supply line; and a control device configured to control the processing liquid producing mechanism based on the measured concentrations of the processing liquid.

7 Claims, 8 Drawing Sheets

(56) References Cited

U.S. PATENT DOCUMENTS

2011/0141844 A1* 6/2011 Schell .................. B01F 5/0641
366/336
2015/0298082 A1  10/2015 Machuca et al.

FOREIGN PATENT DOCUMENTS

| | | |
|---|---|---|
| JP | 2003-158111 A | 5/2003 |
| JP | 2008-535660 A | 9/2008 |
| JP | 2009-172459 A | 8/2009 |
| JP | 2010-232520 A | 10/2010 |
| JP | 2011-125857 A | 6/2011 |
| JP | 2013-071034 A | 4/2013 |
| TW | 200946219 A | 11/2009 |
| WO | 2010-016448 A | 2/2010 |

* cited by examiner

SUBSTRATE LIQUID PROCESSING APPARATUS AND SUBSTRATE LIQUID PROCESSING METHOD

CROSS REFERENCE TO RELATED APPLICATIONS

This application is a divisional of U.S. patent application Ser. No. 14/536,989, filed on Nov. 10, 2014, which claims priority from Japanese Patent Application Nos. 2013-235304 and 2014-205113, filed on Nov. 13, 2013 and Oct. 3, 2014, respectively, all of which are incorporated herein by reference.

TECHNICAL FIELD

The present disclosure relates to a technique for controlling concentration of a processing liquid in a substrate liquid processing apparatus for performing a predetermined liquid processing on a substrate using the processing liquid in which a plurality of raw material liquids is mixed at a predetermined ratio.

BACKGROUND

A process of manufacturing semiconductor devices includes a liquid processing such as cleaning and etching, which are performed by supplying a processing liquid onto a substrate. In order to perform such a liquid processing, a liquid processing system provided with a plurality of liquid processing units is employed, as described in, for example, Japanese Patent Laid-Open Publication No. 2009-172459.

The liquid processing system as described in Japanese Patent Laid-Open Publication No. 2009-172459 includes a tank configured to store a processing liquid, a circulation line connected to the tank, and a pump configured to circulate the processing liquid stored in the tank to the circulation line. The circulation line is connected with a plurality of liquid processing units through branch lines, respectively, and each liquid processing unit performs a predetermined liquid processing on a substrate using the processing liquid that circulates the circulation line.

The processing liquid used for the liquid processing is adjusted by supplying a plurality of raw material liquids from independent raw material liquid supply lines, respectively, to the tank by a predetermined amount, and mixing the raw material liquids in the tank. When the processing liquid is adjusted by the mixing in the tank in this manner, the processing liquid may flow out from the tank before the raw material liquids are mixed sufficiently with each other in the tank. Therefore, the processing liquid may be supplied to the liquid units at an appropriate concentration.

Further, a liquid flow controller (LFC) is provided in each raw material liquid supply line, and each raw material liquid is supplied to the tank depending on a set flow rate and a supply time of each LFC. In a case where it is necessary to control the concentration of the processing liquid to a low concentration or within an allowable range, the supply amount may be insufficiently managed by the set flow rate and the supply time of each LFC.

SUMMARY

In a preferred exemplary embodiment, the present disclosure provides a substrate liquid processing apparatus including a tank configured to store a processing liquid obtained by mixing at least two kinds of raw material liquids; a circulation line configured to allow the processing liquid to flow out from the tank and flow back to the tank; a liquid processing unit configured to perform a liquid processing on a substrate using the processing liquid in the tank; a processing liquid producing mechanism configured to produce the processing liquid by mixing the at least two kinds of row material liquids supplied from respective raw material liquid sources at a controlled ratio; a processing liquid supply line configured to supply the processing liquid produced by the processing liquid producing mechanism to the tank; a concentration measuring device configured to measure a concentration of the processing liquid flowing through the circulation line and a concentration of the processing liquid flowing through the processing liquid supply line, and a control device configured to control the processing liquid producing mechanism such that the concentration of the processing liquid falls within a predetermined concentration range, based on the concentrations of the processing liquid measured by the concentration measuring device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
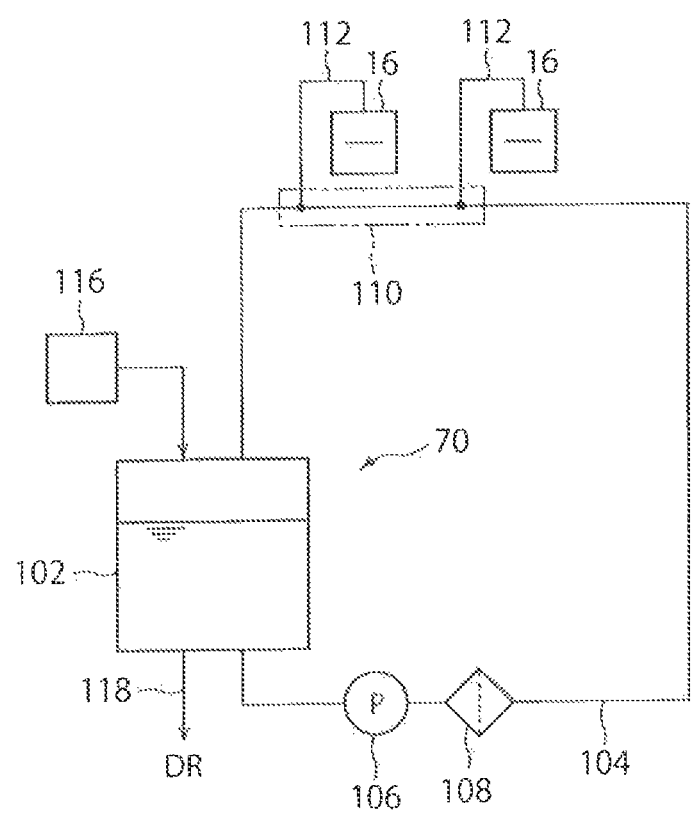
FIG. 1 is a schematic circuit diagram illustrating an overall configuration of a liquid processing apparatus.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

An object of the present disclosure is to provide a technique capable of supplying a processing liquid to a substrate at a precise concentration.

According to a preferred exemplary embodiment, the present disclosure provides a substrate liquid processing apparatus including a tank configured to store a processing liquid obtained by mixing at least two kinds of raw material liquids; a circulation line configured to allow the processing liquid to flow out from the tank and flow back to the tank; a liquid processing unit configured to perform a liquid processing on a substrate using the processing liquid in the tank, a processing liquid producing mechanism configured to produce the processing liquid by mixing the at least two kinds of raw material liquids supplied from respective raw material liquid sources at a controlled ratio; a processing liquid supply line configured to supply the processing liquid produced by the processing liquid producing mechanism to the tank; a concentration measuring device configured to measure a concentration of the processing liquid flowing through the circulation line and a concentration of the processing liquid flowing through the processing liquid supply line; and a control device configured to control the processing liquid producing mechanism such that the concentration of the processing liquid falls within a predetermined concentration range, based on the concentrations of the processing liquid measured by the concentration measuring device.

In the above-mentioned substrate processing liquid apparatus, the control device controls the processing liquid producing mechanism such that the processing liquid is supplied to the tank through the processing liquid supply line at a concentration and in an amount required to cause the concentration of the processing liquid to fall within the predetermined concentration range, based on the concentration of the processing liquid flowing through the circulation line as measured by the concentration measuring device.

In the above-mentioned substrate processing liquid apparatus, the control device controls the processing liquid producing mechanism such that the processing liquid is supplied to the tank through the processing liquid supply line at a concentration and in an amount required to cause the concentration of the processing liquid to fall within the predetermined concentration range, based on the concentration of the processing liquid flowing through the processing liquid supply line as measured by the concentration measuring device.

In the above-mentioned substrate processing liquid apparatus, the control device controls a mixing ratio of the raw material liquids in the processing liquid producing mechanism such that the concentration of the processing liquid flowing through the processing liquid supply line falls within the predetermined concentration range, based on the concentration of the processing liquid flowing through the processing liquid supply line as measured by the concentration measuring device while the processing liquid is supplied from the processing liquid producing mechanism to the tank through the processing liquid supply line.

The above-mentioned substrate processing liquid apparatus further includes a take-out line for concentration measurement configured to take out the processing liquid flowing through the circulation line and send the processing liquid line to the processing liquid supply line. The concentration measuring device is provided in the processing liquid supply line to measure both the concentration of the processing liquid produced by the processing liquid producing mechanism and the concentration of the processing liquid sent from the circulation line to the processing liquid supply line through the take-out line.

In the above-mentioned substrate processing liquid apparatus, the concentration measuring device measures an instantaneous concentration of the processing liquid flowing through the processing liquid supply line. Further, the control device calculates an accumulated average value of the instantaneous concentration measured by the concentration measuring device after the production of the processing liquid is initiated by the processing liquid producing mechanism, monitors the accumulated average value, and controls the processing liquid producing mechanism such that the accumulated average value falls within a predetermined allowable range.

The above-mentioned substrate processing liquid apparatus further includes a drain line branched from the processing liquid supply line and configured to discharge the processing liquid from the processing liquid supply line, and a switching mechanism configured to perform a switch between a first state where the processing liquid produced by the processing liquid producing mechanism flows in the drain line and a second state where the processing liquid producing mechanism is supplied to the tank. The control device controls such that the switching mechanism is set to be the second state when the accumulated average value falls within the predetermined allowable range, and the switching mechanism is set to be the first state when the accumulated average value deviates from the predetermined allowable range.

In the above-mentioned substrate processing liquid apparatus, the concentration measuring device is provided with a first concentration measuring unit configured to measure the concentration of the processing liquid flowing through the circulation line, and a second concentration measuring unit provided in the processing liquid supply line and configured to measure the concentration of the processing liquid flowing through the processing liquid supply line.

According to another preferred exemplary embodiment, the present disclosure provides a substrate liquid processing method using a substrate liquid processing apparatus including a tank configured to store a processing liquid obtained by mixing at least two kinds of raw material liquids; a circulation line configured to allow the processing liquid to flow out from the tank and flow back to the tank; and a liquid processing unit configured to perform a liquid processing on a substrate using the processing liquid in the tank. The method includes measuring a concentration of the processing liquid flowing through the circulation line; obtaining a concentration and an amount of the processing liquid to be supplemented in the tank to cause the concentration of the processing liquid present in the circulation line and the tank to fall within a predetermined range, based on the measured concentration of the processing liquid; and supplying the processing liquid at the obtained concentration and in the obtained amount to the tank. The supplying of the processing liquid at the determined concentration and in the determined amount to the tank includes: mixing the at least two kinds of raw material liquids supplied from respective raw material liquid sources by the processing liquid producing mechanism to produce the processing liquid and sending the processing liquid to the tank through a processing liquid supply line; measuring a concentration of the processing liquid flowing through the processing liquid supply line; and adjusting a mixing ratio of the raw material liquids in the processing liquid producing mechanism such that the concentration of the processing liquid flowing through the processing liquid supply line becomes the obtained concentration based on the measured concentration.

According to still another preferred exemplary embodiment, the present disclosure provides a substrate liquid processing apparatus including a processing liquid producing mechanism configured to produce a processing liquid by mixing at least two kinds of raw material liquids supplied from respective raw material liquid sources; a liquid processing unit configured to perform a liquid processing on a substrate using the processing liquid produced by the processing liquid producing mechanism; a processing liquid supply line configured to supply the processing liquid produced by the processing liquid producing mechanism to the liquid processing unit or a supply target site connected to the liquid processing unit; a concentration measuring device configured to measure an instantaneous concentration of the processing liquid flowing through the processing liquid supply line; and a control device configured to control a mixing ratio of the raw material liquids mixed by the processing liquid producing mechanism. The control device sequentially calculates an accumulated average value of the instantaneous concentration measured by the concentration measuring device, monitors the accumulated average value, and controls the processing liquid producing mechanism such that the accumulated average value falls within a predetermined allowable range with respect to a target concentration.

The above-mentioned substrate liquid processing apparatus further includes a drain line branched from the processing liquid supply line at a branching point on the processing liquid supply line and configured to discharge the processing liquid from the processing liquid supply line; and a switching mechanism configured to perform a switch between a first state where the processing liquid produced by the processing liquid producing mechanism flows in the drain line and a second state where the processing liquid producing mechanism is supplied to the liquid processing unit or the supply target site. The control device controls such that the switching mechanism is set to be the second state when the accumulated average value falls within the predetermined allowable range, and the switching mechanism is set to be the first state when the accumulated average value deviates from the predetermined allowable range.

In the above-mentioned substrate liquid processing apparatus, when the switching mechanism is switched from the first state to the second state, the control device subtracts a part of data of the instantaneous concentration acquired before the switching mechanism is switched from the first state to the second state from data of the instantaneous concentration used for calculation of the accumulated average value to be calculated after the switching mechanism is switched from the first state to the second state.

In the above-mentioned substrate liquid processing apparatus, the supply target site is a tank configured to store the processing liquid, which is connected to the liquid processing unit through a circulation line.

According to yet another preferred exemplary embodiment, the present disclosure provides a substrate liquid processing method using a substrate liquid processing apparatus including a processing liquid producing mechanism configured to produce a processing liquid by mixing at least two kinds of raw material liquids supplied from respective raw material liquid sources; a liquid processing unit configured to perform a liquid processing on a substrate using the processing liquid produced by the processing liquid producing mechanism; a processing liquid supply line configured to supply the processing liquid produced by the processing liquid producing mechanism to the liquid processing unit or a supply target site connected to the liquid processing unit; and a concentration measuring device configured to measure an instantaneous concentration of the processing liquid flowing through the processing liquid supply line. The method includes measuring an instantaneous concentration of the processing liquid flowing through the processing liquid supply line by the concentration measuring device; sequentially calculating an accumulated average value of the instantaneous concentration measured by the concentration measuring device and monitoring the accumulated average value; and allowing the processing liquid for which the monitored accumulated average value falls within a predetermined allowable range with respect to a target concentration to flow to the liquid processing unit or the supply target site. The control of the mixing ratio of the raw material liquids is performed by controlling the processing liquid producing mechanism such that the accumulated average value falls within the predetermined allowable range with respect to the target concentration.

According to the above-mentioned exemplary embodiments of the present disclosure, the processing liquid may be supplied to the substrate at a precise concentration.

Hereinafter, an exemplary embodiment of the present disclosure will be described with reference to the drawings.

As illustrated in FIG. 1, a liquid processing apparatus includes a plurality of processing units (liquid processing units) 16 configured to perform a liquid processing on a substrate, and a processing fluid source 70 configured to supply a processing liquid to the processing units 16.

The processing fluid source 70 is provided with a tank 102 that stores the processing liquids, and a circulation line 104 that goes out of the tank 102 and goes back to the tank 102. The circulation line 104 is provided with a pump 106. The pump 106 forms a circulating flow which is ejected from the tank 102, passes through the first circulation path 104, and returns to the tank 102. At a downstream side of the pump 106, the circulation line 104 is provided with a filter 108 that removes pollutants such as particles. The circulation line 104 may be further provided with an auxiliary device such as, for example, a heater, as necessary.

One or more branch lines 112 are connected to a connecting region 110 provided in the circulation line 104. Each branch line 112 supplies a processing liquid flowing through the circulation line 104 to the corresponding processing unit 16. Each branch line 112 may be provided with a flow rate adjusting mechanism such as a flow rate control valve, a filter and the like, as necessary.

The liquid processing apparatus further includes a tank liquid supplementing unit 116 configured to supplement the processing liquid or components of the processing liquid in the tank 102. The tank 102 is provided with a drain unit 118 for discarding the processing liquids in the tank 102.

Figure 2:
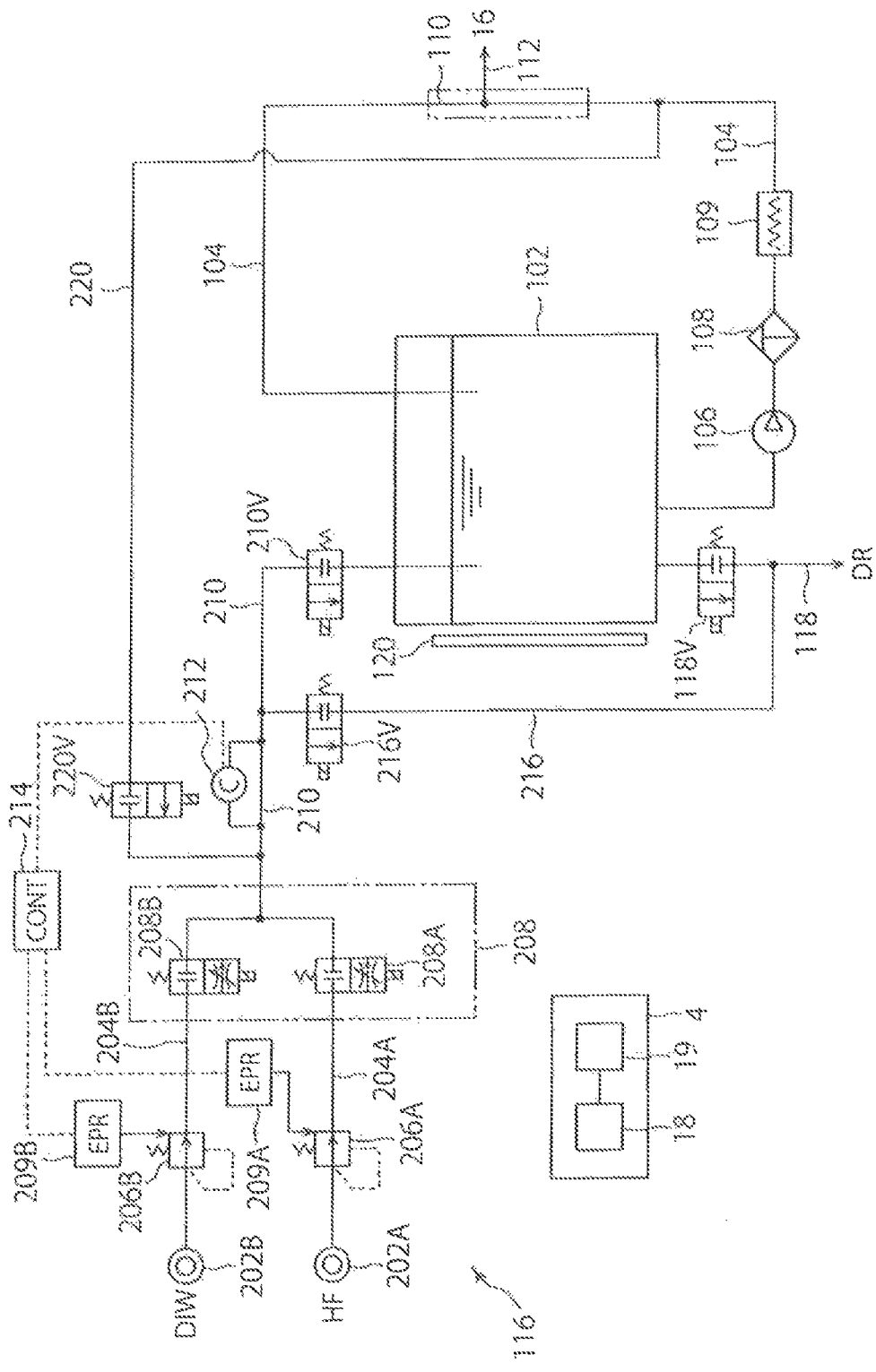
FIG. 2 is a circuit diagram illustrating details of a configuration related to a chemical liquid concentration management in the liquid processing apparatus as illustrated in FIG. 1.

As illustrated in FIG. 2, the liquid processing apparatus includes a control device 4. The control device 4 is, for example, a computer and includes a control unit 18 and a storage unit 19. The storage unit 19 stores programs which control various kinds of processings performed by the liquid processing apparatus. The control unit 18 reads and executes the programs stored in the storage unit 19 to control an operation of the liquid processing apparatus.

Further, the program may be recorded in a computer-readable recording medium, and installed from the recording medium to the storage unit 19 of the control device 4. The computer-readable recording medium may be, for example, a hard disc (HD), a flexible disc (FD), a compact disc (CD), a magnet optical disc (MO), or a memory card.

Next, the tank liquid supplementing unit 116 as illustrated in FIG. 1 and its related components will be described with reference to FIG. 2 that illustrates them in detail. Although simplified in FIG. 2, similarly to FIG. 1, a connecting region 110 is set in the circulation line 104, and one or more branch lines 112 is connected thereto. Further, each branch line 112 is connected to a liquid processing unit 16. In FIG. 2, the reference numeral '109' denotes a heater configured to heat the processing liquid circulating through the circulation line 104.

The tank liquid supplementing unit 116 is provided with a chemical liquid line 204A that allows a chemical liquid (hydrofluoric acid (HF) in the present exemplary embodiment) serving as a first raw material liquid supplied from a chemical liquid source 202A to flow therein, and a diluent line 204B that allows a diluent (deionized water (DIW) in the present exemplary embodiment) serving as a second raw material for diluting the chemical liquid to flow from a diluent source 202B.

Constant-pressure valves 206A, 206B are interposed in the chemical liquid line 204A and the diluent line 204B, respectively.

The chemical liquid line 204A and the diluent line 204B are connected to a mixing valve 208 at a downstream side of the constant-pressure valves 206A, 206B. The mixing valve 208 has a configuration in which two variable throttle valves 208A, 208B having an opening/closing function are integrated therein. The liquids flowing through the chemical liquid line 204A and the diluent line 204B flows at a flow rate restricted by the variable throttle valves 208A, 208B which are adjusted to a predetermined opening degree, and join afterwards. Accordingly, a processing liquid is produced, in which a chemical liquid and a diluent are mixed at a predetermined ratio. That is, the constant-pressure valves 206A, 206B and the mixing valve 208 provided in the chemical liquid line 204A and the diluent line 204B constitute a processing liquid producing mechanism.

The constant-pressure valves 206A, 206B have a function to control a decompression such that a pressure at a secondary side is maintained at a desired constant pressure, regardless of variation in pressure at a primary side. The chemical liquid supplied from the chemical liquid source 202A and the diluent source 202B is usually varied in pressure. Therefore, in order to obtain a precise mixing ratio of the chemical liquid and diluent, the constant-pressure valves 206A, 206B are preferably employed.

The constant-pressure valves 206A, 206B used in the present exemplary embodiment are capable of changing a set value of the primary side pressure by changing a pressure (pilot pressure) of a pressurized air introduced into a pilot port. The pilot pressure is adjusted by electropneumatic regulators (EPR) 209A, 209B.

In the present exemplary embodiment, the opening degree adjusting function of the variable throttle valves 208A, 208B incorporated in the mixing valve 208 is used only for an initial setting, and the variable throttle valves 208A, 208B are used as fixed throttles during operation. The flow rate adjustment of the chemical liquid and the diluent is performed using a secondary side pressure adjusting function of the constant-pressure valves 206A, 206B. The flow rates of the liquids flowing through the chemical liquid line 204A and the diluent line 204B may be adjusted by changing the secondary side pressure of the constant-pressure valves 206A, 206B, that is, the primary side pressure of the variable throttle valves 208A, 208B as the fixed throttles. The variable throttle valves 208A, 208B are used for the purpose of pressure loss balance adjustment rather than the flow rate adjustment.

More specifically, in the present exemplary embodiment, the concentration adjustment is performed by setting a set secondary side pressure of the constant-pressure valve 206A in the chemical liquid line 202A to be constant, and changing a set secondary side pressure of the constant-pressure valve 206B in the diluent line 202B. Thus, the concentration may be adjusted more precisely when adjusting the flow rate of the diluent in a relatively larger amount than when adjusting the flow rate of the chemical liquid in a relatively smaller amount.

The mixing valve 208 is connected with a processing liquid supply line 210 configured to supply the processing liquid adjusted by the mixing valve 208 to the tank 102.

A densitometer 212 is attached to the processing liquid supply line 210 to measure the concentration of the processing liquid flowing through the processing liquid supply line 210 (the concentration of the chemical liquid contained in the processing liquid). Depending on the kind of chemical liquids to be measured, or precision required, any densitometer 212 may be used, including, for example, a densitometer that measures concentration based on a conductivity and a densitometer that measures concentration based on an ultrasonic wave propagation speed.

A detection signal of the densitometer 212 is inputted to a concentration controller 214. The concentration controller 214 may be a part of the control device. The concentration controller 214 performs a feedback control such that the flow rate of the diluent (DIW) flowing through the diluent line 204B is changed by adjusting the pilot pressure sent from the electropneumatic regulator 209B to the constant-pressure valve 206B in accordance to the detection signal from the densitometer 212 to adjust the secondary side pressure of the constant-pressure valve 206B, and hence, the concentration of the processing liquid flowing out from the mixing valve 208 becomes a desired concentration. Further, in the present exemplary embodiment, since the concentration of the processing liquid is adjusted by adjusting only the flow rate of the diluent in a large amount, the pilot pressure sent from the electropneumatic regulator 209A to the constant-pressure valve 206B is maintained constantly.

A preliminary disposal drain line 216 is branched from the processing liquid supply line 210 and joins the drain line 118. An opening/closing valve 216V is interposed in the drain line 216. An opening/closing valve 210V is also interposed in the processing liquid supply line at a downstream side from the branching point of the drain line 216.

A take-out line 220 that takes out the processing liquid for concentration measurement is branched from the circulation line 104 and joins the processing liquid supply line 210 at a joining point between the mixing valve 208 and the densitometer 212. An opening/closing valve 220V is interposed in the take-out line 220.

A liquid level meter 120 is attached to the tank 102 to detect a liquid level of the processing liquid in the tank 102.

Next, an operation method of the liquid processing apparatus will be described. Operation of each component in the following descriptions is performed under the control of the control device 4. The concentration controller 214 is controlled by the control device 4, and concentration information acquired by the concentration controller 214 is transmitted to the control device 4.

First, descriptions will be made on a basic order of supplying the processing liquid at a desired concentration to the tank 102 by the tank liquid supplementing unit 116.

An opening degree of the variable throttles 208A, 208B of the mixing valve 208 suitable to obtain a desired concentration of the processing liquid is determined by a test operation, and the opening degree of the variable throttles 208A, 208B is set to such an opening degree in advance. Similarly, a pilot pressure of the constant-pressure valves 206A, 206B suitable to obtain a desired concentration of the processing liquid is also determined by a test operation, and the value is stored as a control standard value in the concentration controller 214.

First, the opening/closing valve 216V of the drain line 216 is opened and the opening/closing valve 210V of the processing liquid supply line 210 is closed by applying a predetermined pilot pressure to the pilot ports of the constant-pressure valves 206A, 206B. Further, the variable throttles 208A, 208B of the mixing valve 208 are opened to a predetermined opening degree. The opening/closing valve 220V of the take-out line 220 is closed.

Then, the chemical liquid and the diluent flow into the mixing valve 208 from the chemical liquid line 204A and the diluent line 204B at predetermined flow rates, respectively. The chemical liquid and the diluent are mixed in the mixing valve 208 in a mixing ratio corresponding to the flow ratio, flows to the processing liquid supply line 210, and flows to the drain line 216. That is, a preliminary disposal operation is first performed to discard the adjusted processing liquid, but not to supply the adjusted processing liquid to the tank 102. In general, since it takes some time until the flow rates of the chemical liquid and the diluent become stable, the preliminary disposal operation is preferably performed.

During the preliminary disposal operation, the concentration of the processing liquid is monitored by the densitometer 212, and the concentration controller 214 performs the above-mentioned feedback control such that the concentration of the processing liquid becomes a desired concentration. When the concentration measured by the densitometer 213 becomes stable, the opening/closing valve 216V of the drain line 216 is closed and the opening/closing valve 210V of the processing liquid supply line 210 is opened such that the processing liquid is supplied into the tank 102.

While the processing liquid is supplied from the processing liquid supply line 210 to the tank 102, or while the processing liquid flows through the processing liquid supply line 210, the concentration is continuously monitored by the densitometer 212. In a case where the concentration of the processing liquid is higher (lower) than a target value, the concentration controller 214 changes the pilot pressure supplied from the electropneumatic regulator 209B to the constant-pressure valve 206B such that the flow rate of the diluent increases (decreases), and hence, the concentration of the processing liquid supplied to the tank 102 is maintained within an allowable range.

This control is performed by a feedback control which corrects an operation amount MV (the pilot pressure, that is, the opening degree of the constant-pressure valve 206A) based on a deviation of a measurement value PV (the detection value of the densitometer 212) with respect to a set value (the target concentration). That is, since this control is not intervened by a so-called flow rate detection step, an expensive high-accuracy flow rate detector or a flow regulator with a built-in flow rate detector (such as a liquid flow controller) is not required.

However, the densitometer 212 usually measures the concentration of the processing liquid flowing through the processing liquid supply line 210 by a predetermined sampling period (e.g., about 0.1 to 0.2 ms). Hereinafter, in the present specification, the concentration of the processing liquid at each sampling time point may be referred to as an 'instantaneous concentration'. Monitoring the concentration of the processing liquid may be performed by the densitometer 212 during the above-mentioned preliminary disposal operation, based on comparison of the instantaneous concentration values with the allowable concentration range. Further, a feedback control may be performed by assuming the instantaneous concentration value at each sampling time point as a measurement value PV, and the target concentration value as a set value SV.

Further, the instantaneous concentration measured by the densitometer 212 fluctuates to some extent with a predetermined range over time (the reason will be described later). Therefore, in order to avoid excessively sensitive monitoring and control and stabilize the operations of the apparatus, the above-mentioned monitoring and feedback control may be performed based on a moving average value of the instantaneous concentration instead of individual instantaneous concentration values.

When the processing liquid is supplied from the tank liquid supplementing unit 116 to an empty tank 102 (immediately after installation of the liquid processing apparatus, or during a whole exchange of the processing liquid in the tank), the following procedure will be executed.

According to the above-mentioned basic procedure, a processing liquid is adjusted to a predetermined concentration after the preliminary disposal operation is performed for a predetermined time, and then, the processing liquid is supplied from the processing liquid supply line 210 to the tank 102. At this time, the opening/closing valve 118V of the drain line 118 and the opening/closing valve 220V of the take-out line 220 are all closed.

When a certain amount of the processing liquid is stored in the tank 102, the pump 106 is operated to circulate the processing liquid in the circulation line 104 while supplying the processing liquid to the tank 102 until the liquid level of the processing liquid in the tank 102 reaches a predetermined height.

When a predetermined amount of the processing liquid is stored in the tank 102, a substrate processing is started in the processing units 16. That is, in a state where the processing liquid stored in the tank 102 is being circulated to the circulation line 104, an opening/closing valve and a flow rate adjusting valve (both not illustrated) provided in the branch line 112 are operated to send the processing liquid from the circulation line 104 to the processing units 16 through the branch line 112, as necessary. Using this processing liquid, a predetermined processing is performed on substrates in the processing units 16.

Further, when the whole exchange of the processing is performed, a circulation system including the tank and the circulation line may be cleaned with a flushing liquid (e.g., deionized water) before the processing liquid is stored in the tank. In this case, the flushing liquid may remain in the circulation system and may not be fully removed by prewashing with the processing liquid. Then, the concentration of the processing liquid in the circulation system may be confirmed in accordance with the concentration monitoring procedure before the processing is started, and if there is an abnormality, a concentration correction of the processing liquid may be performed in accordance with a concentration correction procedure to be described later.

Since the processing liquid in the tank 102 is consumed in the liquid processing performed in the processing units 16, its amount is reduced over time. Therefore, when the processing liquid is reduced by a predetermined amount, a processing liquid is supplemented from the tank liquid supplementing unit 116 to the tank 102. The liquid processing continues while supplementing the processing liquid. Further, as for the processing liquid included in the circulation system including the tank 102 and the circulation line 104, the concentration thereof varies over time due to evaporation of the solvent (the diluent) and resolution. For example, when the processing liquid is a hot diluted hydrofluoric acid (DHF), HF concentration in DHF is reduced gradually over time.

Therefore, when the processing liquid supplement is performed, the concentration correction of the processing liquid included in the circulation system including the tank 102 and the circulation line 104 is performed. For example, if the measured concentration of the processing liquid is lower than a target value, the concentration of the processing liquid present in the circulation system approaches the target value by supplementing a processing liquid at a higher concentration than the target value, to the tank 102.

Comprehensively considering an operation situation of the apparatus, a status whether or not the processing liquid is liable to change over time, and a scope of a 'processing allowable concentration range (to be described later)', timing of performing the concentration correction may be determined, for example, as follows:

(1) The supplement of the processing liquid is performed when the liquid level in the tank 102 detected by the liquid level meter 120 is lowered to a certain threshold, and at this time, the concentration correction is performed (a regular concentration correction).

(2) The concentration of the processing liquid in the circulation system is monitored all the time or periodically (or when there is a concern of a change m concentration after a long-term stoppage of the apparatus), and when the concentration deviates from a 'correction standard concentration range (to be described later)', the concentration correction is performed (a concentration correction based on monitoring).

The 'correction standard concentration range' is defined as follows. There is a 'processing allowable concentration range' as a prerequisite of setting the 'correction standard concentration range'. The 'processing allowable concentration range' means a range which may cause an unallowable problem in a case where a substrate processing is performed with a processing liquid of a concentration out of the range. Further, in a case where the concentration deviates from the 'processing allowable concentration range, the liquid processing apparatus is immediately emergency-stopped. A 'correction start concentration range' is a concentration range narrower than the 'processing allowable concentration range', and is set with a safety margin which does not easily deviate from the 'processing allowable concentration range' even when the liquid processing apparatus is operated for a certain time in a state of deviating from the range. Further, the 'target value' of the concentration is, for example, a median of the 'correction start concentration range'.

In the case of the above-mentioned (1), it is necessary to monitor the concentration of the processing liquid in the circulation system at least once before the supplement of the processing liquid. This is to determine an amount and a concentration of the processing liquid to be supplemented.

When the concentration of the processing liquid in the circulation is monitored, the variable throttle valves 208A, 208B of the mixing valve 208 are closed, the opening/closing valve 220V of the take-out line 220 is opened, and the opening/closing valve 210V of the processing liquid supply line 210 is opened, using the opening/closing function while the pump 106 is operated. Further, the opening/closing valve 216 of the drain valve remains closed. Thus, a part of the processing liquid flowing in a slightly upstream of the connecting region 110 of the circulation line 104 flows into the processing liquid supply line through the take-out line 220, and flows to the tank 102. Accordingly, the concentration of the processing liquid flowing through the circulation line 104 may be measured by the densitometer 212 attached to the processing liquid supply line 210.

In the case of the above-mentioned '(1) regular concentration correction', the processing liquid is supplemented when the liquid level in the tank 102 is lowered to a certain threshold. Therefore, the total amount of the processing liquid present in the circulation is well-known at a time of starting the processing liquid supplement. Accordingly, since the liquid level of the processing liquid in the tank 102 is usually set to an upper limit height, the amount of the processing liquid to be supplemented may be known. Therefore, if the concentration of the processing liquid present in the circulation system is known before the supplement, a concentration of the processing liquid to be supplemented is easily determined by calculation, which is required to make a concentration of the processing liquid present in the circulation system after the supplement to be the target value. Such a calculation may be performed by the control unit 4. If a concentration to be supplemented is known, a processing liquid at that concentration may be supplied from the tank liquid supplementing unit 116 to the tank 102 based on the above-mentioned basic procedure.

In the case of the above-mentioned '(2) concentration correction based on monitoring', the opening/closing valve 118V of the drain line 118 is opened, and the processing liquid in the tank 102 is drained until the liquid level becomes a predetermined height, while monitoring the liquid level of the processing liquid in the tank 102 by the liquid level meter 120. Thereafter, the same procedure as in the '(1) regular concentration correction' may be performed.

According to the above-mentioned exemplary embodiment, since the tank 102 is supplied with a processing liquid which is adjusted to a predetermined concentration, the concentration of the processing liquid flowing out to the circulation line 104 is stabilized, thereby enhancing the stability of the process. If a plurality of raw material liquids is supplied separately to the tank 102, these raw material liquids may flow out to the circulation line 104 before the raw materials are mixed sufficiently in the tank 102, and may be supplied to substrates by processing units. However, such a phenomenon does not happen in the exemplary embodiment.

Further, according to the exemplary embodiment, the control of the concentration of the processing liquid is performed by the feedback control of the valve opening degree (the opening degree of the constant-pressure valve 206B based on the detection value of the densitometer 212 attached to the processing liquid supply line 201. Therefore, the concentration of the processing liquid may be controlled more rapidly and more precisely, as compared with a case where the concentration of the processing liquid, which is a mixed liquid of raw material liquids, is controlled indirectly by flow control of the raw materials. Further, it is possible to omit a cumbersome calculation such as an arithmetic operation of necessary flow rate from a concentration, which is required in a case where a liquid flow controller (LFC) is controlled based on the detection value of the densitometer 212.

According to the exemplary embodiment, both the concentration of the processing liquid supplied from the tank liquid supplementing unit 116 to the tank 102 and the concentration of the processing liquid flowing through the circulation line 104 may be measured by a concentration measuring device including one common densitometer 212. Therefore, the number of expensive densitometers may be reduced, and thus, cost for the liquid processing apparatus may be reduced.

Figure 3:
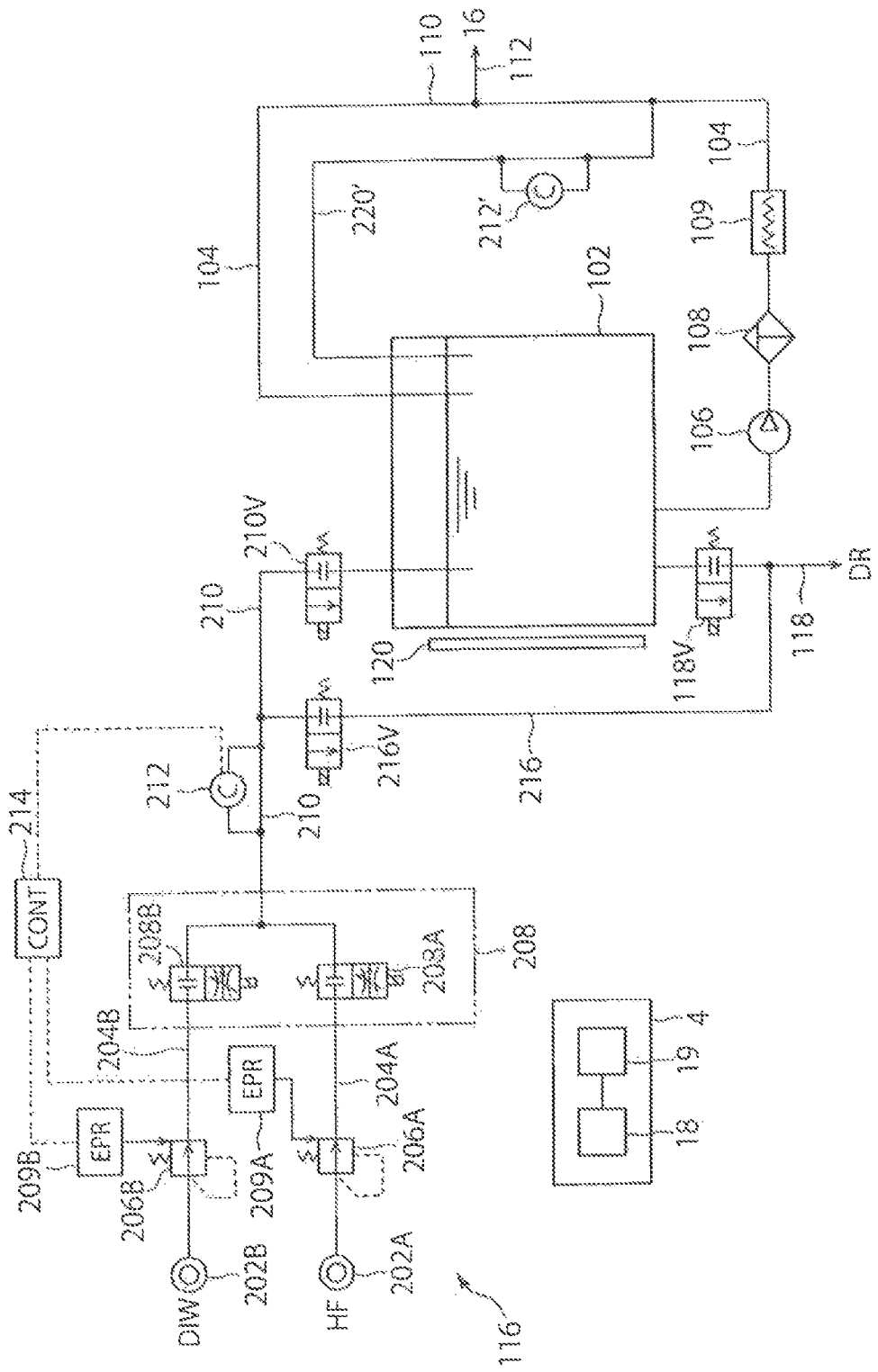
FIG. 3 is a circuit diagram illustrating an alternative embodiment of FIG. 2.

However, the concentration measuring device may be configured with two densitometers. Specifically, for example, as illustrated in FIG. 3, a densitometer 212' for measuring the concentration of the processing liquid flowing through the circulation line 104 may be provided separately from the densitometer 212 for measuring the concentration of the processing liquid supplied from the tank liquid supplementing unit 116 to the tank 102. In the alternative embodiment as illustrated in FIG. 3, a take-out line 220' is branched from the circulation line 104 and extends to the inside of the tank 102. The densitometer 212' is attached to the take-out line 220'. The densitometer 212' may also be attached directly to the circulation line 104 without providing the take-out line 220'. In FIG. 3, the same reference numerals are given to the same parts as those illustrated in FIG. 2.

According to the alternative embodiment as illustrated in FIG. 3, it is possible to measure the concentration of the processing liquid flowing through the circulation line 104 and the concentration of the processing liquid supplied from the tank liquid supplementing unit 116 at the same time. Therefore, it is possible to deal with a change in concentration of the processing liquid quickly, and a precise concentration control is possible as well.

Hereinafter, detailed descriptions will be made on another preferred exemplary embodiment of a method of monitoring and controlling a concentration of the processing liquid supplied from the processing liquid supply line 210 to the tank 102 (or discarded to the drain line 216), using the densitometer 212.

Figure 4:
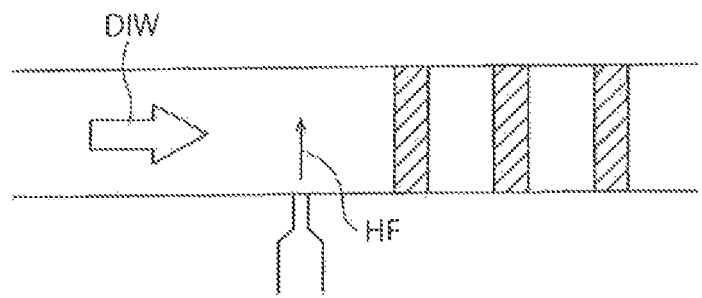
FIG. 4 is a view for explaining a concentration distribution of a liquid flowing direction.

FIG. 4 illustrates an example of a configuration of a joining portion of the chemical liquid line 204A and the diluent line 204B in the mixing valve 208. In this example, HF, which is a chemical liquid, is injected in a direction substantially perpendicular to a linear flow of DIW, which is a diluent. Since both of the liquids (DIW and HF) are sent by a pump, some pressure variation occurs inevitably in the liquid flow. That is, a speed of a liquid is varied (when viewed microscopically) in conjunction with a pressure variation when observing the speed of the liquid at a fixed point. Thus, a chemical liquid concentration distribution in a liquid flowing direction (thick hatched portions) occurs as schematically illustrated in FIG. 4. Since both DIW and HF have the above-mentioned pressure variation in practice, the chemical liquid concentration distribution is actually more complicated.

Figure 5:
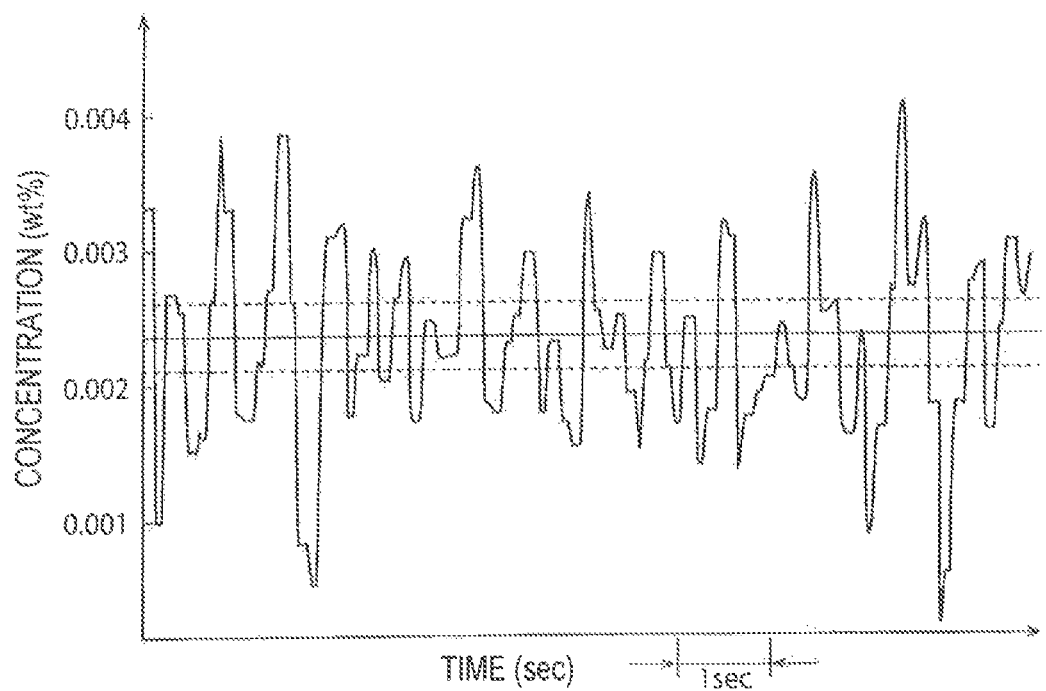
FIG. 5 is a graph illustrating a pattern in which a detection value of a densitometer fluctuates depending on the concentration distribution of the liquid flowing direction.

The densitometer 212 measures the concentration of the processing liquid flowing through the processing liquid supply line 210 by a predetermined sampling period (e.g., about 0.1 to 0.2 ms). Due to the chemical liquid concentration distribution in the liquid flowing direction as described above, the measurement value of the densitometer 212 fluctuates severely as illustrated in the graph of FIG. 5. In the graph of FIG. 5, the vertical axis denotes an HF concentration in the processing liquid (HF+DIW), and the horizontal axis denotes a time elapsed. Here, a target value of the HF concentration is 0.0023%, and the target value is shown by a solid horizontal line in the graph. Further, an allowable range of the variation with respect to the target value of the HF concentration is 0.2%, and the allowable range is shown by two dotted horizontal lines.

The fluctuation of the detection value of the densitometer 212 as illustrated in the graph of FIG. 5 is an obstacle to determining (concentration monitoring) whether or not the tank 102 is supplied with the processing liquid flowing through the processing liquid supply line 210. Further, the feedback control of the mixing ratio becomes unstable. The reason is that the detection value of the densitometer 212 becomes stable and does not stay within the allowable range because the variation of the detection value is caused by the inevitable pressure variation as described above. In the above-mentioned exemplary embodiment, the concentration monitoring and the feedback control were performed based on the instantaneous concentration values or the moving average of the instantaneous concentration values. However, in a case where the processing liquid is supplied to a substrate at a more precise concentration with respect to the concentration target value, the monitoring and control using the moving average of the instantaneous concentration values are not sufficient. Therefore, there is a room for further improvement.

In the present exemplary embodiment, the feedback control of the mixing ratio and the determination of supplying the processing liquid to the tank 102 are performed based on the average value (here, an accumulated average value as described later) of the concentration of the processing liquid, from understanding that a microscopic concentration variation does not adversely affect the processing result. Here, the supply of the processing liquid based on the determination procedure and the determination will be described with reference to the graph of FIG. 6 and the flowchart of FIG. 7.

Figure 6:
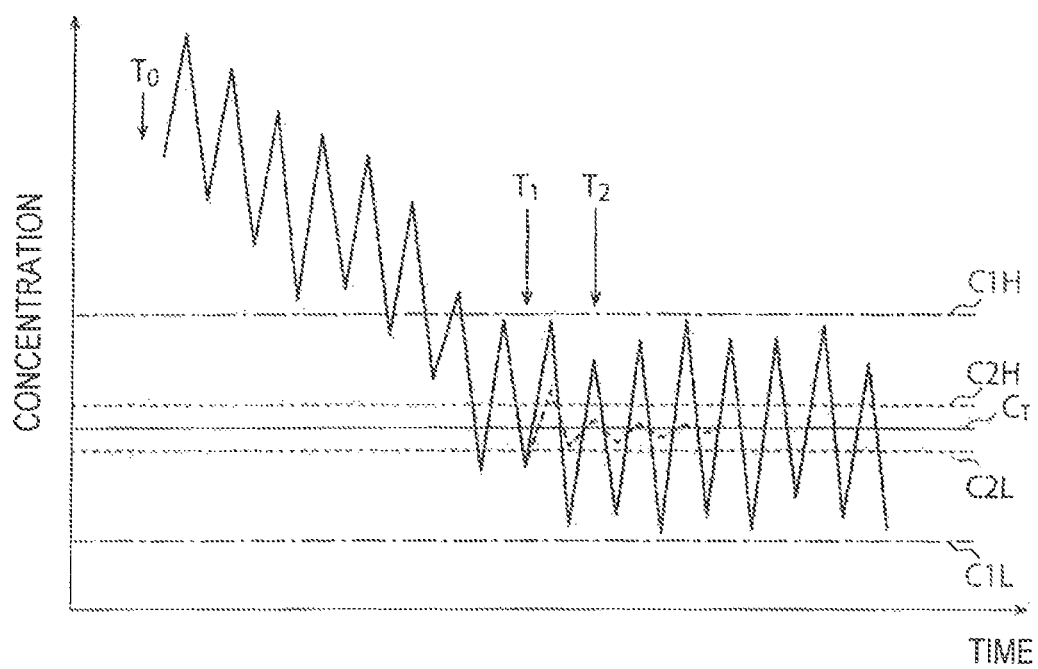
FIG. 6 is a graph illustrating a supply determination procedure of a processing liquid to a tank.

In the graph of FIG. 6, the vertical axis denotes an HF concentration in the processing liquid (HF+DIW), and the horizontal axis denotes a time elapsed. The horizontal solid line CT present in the center of the height direction denotes a concentration target value, and corresponds to the solid horizontal line in FIG. 5. The region between two horizontal dashed lines C1H, C1L denotes an integrated concentration monitoring start standard range (±1%). The region between two horizontal dotted lines C2H, C2L denotes a concentration allowable range (a concentration range of the processing liquid which is allowed to flow to the tank 102) (±0.2%), and corresponds to the dotted horizontal lines of FIG. 5. In FIG. 6, the fluctuation wave form of the concentration detected by the densitometer 212 is a simple saw tooth form, but this is for simplification of the drawing. The actual concentration change is shown in FIG. 5.

As described above, a chemical liquid and a diluent flow from the chemical liquid line 204A and the diluent line 204B, respectively, to the mixing valve 208 at flow rates controlled by the concentration controller 214, and the chemical liquid and the diluent are mixed in the mixing valve 208 at a mixing ratio corresponding to the flow ratio, so that the production of the processing liquid (the mixed liquid) starts. Immediately after the production of the processing liquid starts, a preliminary disposal operation is performed to flow the produced processing liquid (the diluted chemical liquid) to the drain line 216. The start time point of the preliminary disposal operation corresponds to time point T0 in the graph of FIG. 6, and corresponds to a start time point of step S1 in the flowchart of FIG. 7. That is, monitoring of the instantaneous concentration (individual raw data of the concentration of the processing liquid measured by the densitometer 212) starts from time point T0 (step S1).

In the example of FIG. 6, the concentration of the diluted chemical liquid (HF+DIW=DHF), that is, the processing liquid is set to be higher than the target value CT at the preliminary disposal operation start time point (the concentration may be of course lower). When the concentration control by the concentration controller 214 starts under the condition, the flow rate of the diluent flowing through the diluent line 204B increases, and as a result, the concentration of the diluted chemical liquid comes close to the target value CT. Also, at this time, for the reason as described above, the instantaneous concentration values detected by the densitometer 212 severely fluctuates.

Figure 7:
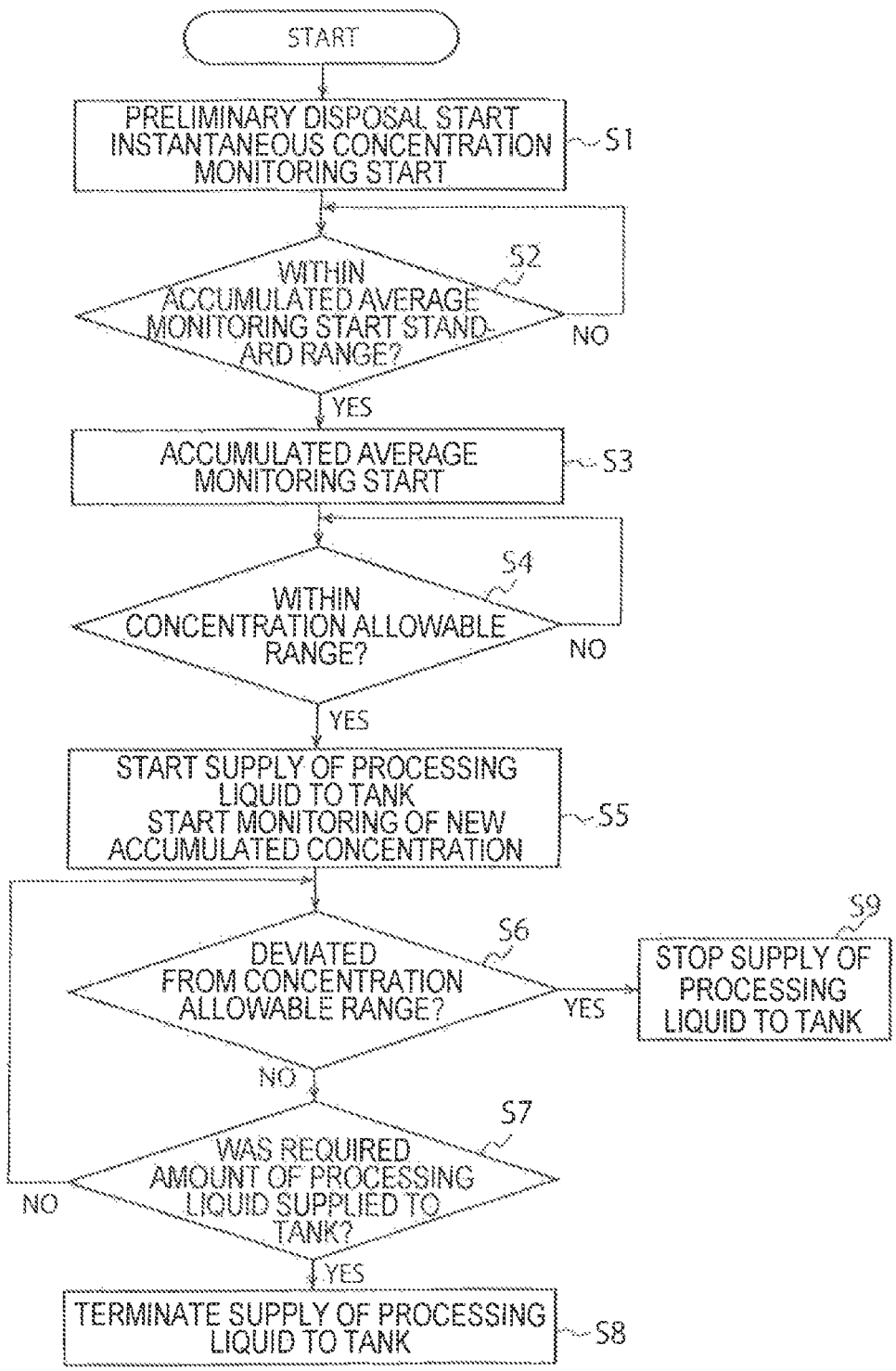
FIG. 7 is a flowchart illustrating a supply of the processing liquid to the tank based on the supply determination procedure of the processing liquid to the tank and the determination

When the instantaneous concentration values falls within the accumulated average monitoring start standard range between the horizontal lines C1H (corresponding to a first upper limit), C1L (corresponding to a first lower limit) (time point T1 in FIG. 6, and Yes of step S2 in FIG. 7), the arithmetic operation of the accumulated average of the instantaneous concentration and the monitoring of accumulated average values start (time point T1 in FIG. 6, and step S3 in FIG. 7). For example, from the fact that a plurality of (e.g., about 10) successive instantaneous concentration values (data) falls within the accumulated average monitoring start standard range, or does not deviated from the accumulated average monitoring start standard range for a predetermined period of time alter the instantaneous concentration values once go in the accumulated average monitoring start standard range, it may be determined that 'the instantaneous concentration falls within the accumulated average monitoring start standard range'. In the example of FIG. 6, three successive instantaneous concentration values (data) are within the accumulated average monitoring start standard range at time point T1.

The term 'accumulated average' as used in the specification means an arithmetic average $((X_1+X_2+ \ldots X_n)/n)$ of all data from a first acquired data $X_1$ (that is, at time point T1) to a data $X_n$ last acquired for calculating the average value. Accordingly, as an average is calculated later in terms of time, the average becomes an average value of more data. In the above-mentioned point, the 'accumulated average' always has the same number of data for average calculation, and is different from a 'moving average' in which a period of acquiring data for average calculation shifts gradually to a later side in terms of time.

For the supply control of the processing liquid based on the calculation of the accumulated average value and the calculation result, the control device 4 is provided with a memory that accumulates the instantaneous concentration data sent from the densitometer 212.

When the concentration control is performed normally, the accumulated average value converges on the target value. When the accumulated average value falls within the concentration allowable range between the two horizontal dotted lines C2H, C2L (time point T2 in FIG. 6, and Yes of step S4 in FIG. 7), the control device 4 closes the opening/closing valve 216V and opens the opening/closing valve 210V. As a result, the preliminary disposal of the processing liquid (the diluted chemical liquid) is terminated, and the supply of the processing liquid (the diluted chemical liquid) from the processing liquid supply line 210 to the tank 102 starts (step S5 in FIG. 7). For example, from the fact that a plurality (n) of (e.g., about 10) successive accumulated average values are within the concentration allowable range, or does not deviated from the concentration allowable range for a predetermined period of time t after the accumulated average values once go in the concentration allowable range, it may be determined that 'the accumulated average values fall within the concentration allowable range'.

Figure 8:
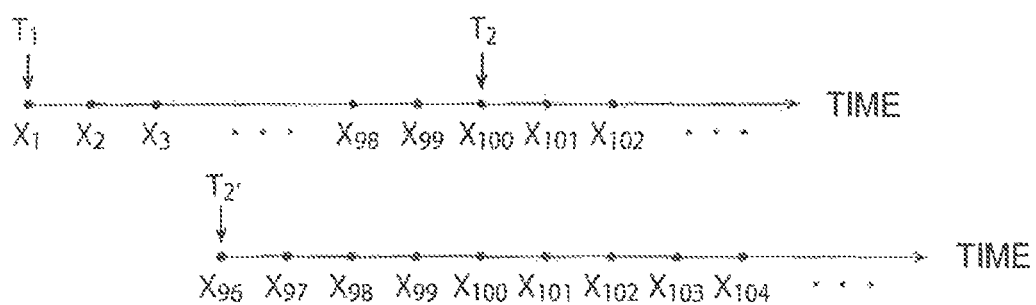
FIG. 8 is a view illustrating a conversion of an accumulated average calculation.

The supply of the processing liquid to the tank 102 starts (time point T2), and at the same time, the control device 4 starts calculating new accumulated average values. Here, a calculation method of a new accumulated average value will be described with reference to FIG. 8. In FIG. 8, the 100th instantaneous concentration data is acquired at time point T2, and hence, the (old) accumulated average value is $(X_1+X_2+ \ldots X_{100})/100$ at time point T2. The new instantaneous integrated value may be calculated by an equation $(X_{100}+X_{101}+ \ldots X_N)/(N-100+1)$. If so, however, there is a high possibility that the new accumulated average value obtained in a short time immediately after time point T2 will severely fluctuate. Accordingly, using this as a determination standard is undesirable from the viewpoint of the stability of the determination.

Therefore, in the present exemplary embodiment, the calculation of a new accumulated average value employs an instantaneous concentration data acquired at time point T2' going back from time point T2 by a predetermined time. Here, the instantaneous concentration data $X_{96}$ is regarded as a first instantaneous concentration data for calculating the new accumulated average value. That is, the new accumulated average value is calculated based on an equation $(X_{96}+X_{97}+ \ldots X_N)/(N-100+5)$. That is, the control device 4 may consider to continuously calculate the accumulated average from the instantaneous concentration data used for calculation of the accumulated average value calculated after time point T2 except for a part of the instantaneous concentration data calculated before time point T2 (the data acquired from time point T1 to a time point immediately before time point T2'). Further, at time point T2', it is desirable that a plurality of (an appropriate number smaller than the n, for example, about five) successive accumulated average values is already within the concentration allowable range, or that the accumulated average values once fall within the concentration allowable range and do not deviate from the concentration allowable range for a predetermined time (an appropriate time shorter than the time t).

After time point T2, the control device 4 continuously monitors a new accumulated average value. If the accumulated average value deviates from the above-mentioned accumulated average allowable range (Yes of step S6 in FIG. 7), the control device 4 immediately opens the opening/closing valve 216V and closes the opening/closing valve 210V. As a result, the supply of the processing liquid to the tank 102 is stopped, and the preliminary disposal of the processing liquid to the dram line 216 is performed again (step S9 in FIG. 7)

After the second preliminary disposal starts, the process may return to step S1. At this time, if the determination of step S2 is still 'No', or the determination of step S4 is still 'No', it is estimated that there is an abnormality in a constitutional device. Then, the control device 4 issues an alarm after a preset time elapses.

If the determination of step S6 in FIG. 7 is still 'No', the supply of the processing liquid to the tank 102 continues until a required amount of the processing liquid is stored in the tank 102 (steps S7, S8 in FIG. 7).

Further, when the instantaneous concentration value falls within the accumulated average monitoring start standard range between the horizontal lines C1H (corresponding to the first upper limit), C1L (corresponding to the second lower limit) (corresponding to time point T1, and Yes of step S2 in FIG. 7), after a predetermined time (e.g., one second) elapses at a time point when the value falls within the range, the measurement value PV in the feedback control of the mixing ratio is converted into an accumulated average value of the concentration, and the feedback control is performed based on the deviation of the accumulated average value of the instantaneous concentration values with respect to the target concentration value (the set value SV). For the measurement value PV in the feedback control before the conversion, for example a moving average of the instantaneous concentration values may be used (the set value SV may be the same target concentration value). Accordingly, the control may be performed stably. Further, at the same time as the supply of the processing liquid to the tank 102 starts, the measurement value PV in the feedback is converted into the same new accumulated average value as one described above.

The control and monitoring of the concentration of the processing liquid may be performed using the accumulated average as described above so that the processing liquid at a precise concentration is supplied to the tank 102 while avoiding instability of the concentration control of the apparatus. In practice, according to the inventors' experiment, when the concentration of the processing liquid was measured after the processing liquid was supplied to the tank 102 and flowed through the circulation line 104 to be homogenized sufficiently, the concentration fell within the concentration allowable range of the processing liquid. It is also possible to determine whether or not the control of the mixing ratio and the supply of the processing liquid to the tank 102 start, based on the instantaneous concentration values or the moving average thereof. However, a relatively complicated logic may be required for the determination of the supply of the processing liquid, and the determination may require a long time. Further, it may take very long time until the concentration of the processing liquid is stabilized within the allowable range because the control becomes unstable. If the determination and the stabilization of the concentration requires a long time, it is not economical because the operation efficiency of the liquid processing apparatus deteriorates, and the amount of the processing liquid discarded in the preliminary disposal increases. On the contrary, when the accumulated average is used, the determination may be performed based on a very simple logic, and it may take short time to determine whether or not the supply of the processing liquid to the tank 102 starts. Accordingly, the processing liquid at a precise concentration may be supplied to substrates in a short time.

Next, in fully exchanging the processing liquid in the circulation system including the tank 102 and the circulation line 104, a preferred exemplary embodiment will be described, in which the processing liquid is supplied to the tank 102 after cleaning the circulation system including the tank and the circulation line with a flushing liquid (e.g., deionized water) before collecting the processing liquid in the tank 102. In this case, since a certain amount of the flushing liquid remains inevitably in the circulation system, it is generally difficult to store the processing liquid in the tank 102 at a precise concentration.

In this exemplary embodiment, the processing liquid is not supplied to the tank 102 once until a fill liquid state, but the processing liquid is supplied to the tank 102 at least in twice. In the first time, the processing liquid is supplied in an amount of approximately half of the rated capacity of the tank 102. The supply amount of the processing liquid to the tank 102 is controlled based on the detection value of the liquid level meter 120. Although not illustrated in detail in FIG. 2, the liquid level meter 120 is configured with a plurality of liquid level sensors (not illustrated) such as, for example, four liquid level sensors detecting a lower limit liquid level LL, a low liquid level L, a high liquid level H, and an upper limit liquid level HH, respectively. The high liquid level H is a liquid level when the processing liquid of the rated capacity of the tank 102 is present in the tank 102. The low liquid level L is a liquid level in which the supplement of the processing liquid is required when the liquid level becomes lower than the low liquid level L due to the consumption of the processing liquid. In this exemplary embodiment, the processing liquid is supplied to the tank 102 up to the low liquid level L by the first supply of the processing liquid, and then, supplied up to the high liquid level H by the second supply of the processing liquid.

Corresponding to the first supply of the processing liquid, a target concentration of the processing liquid to be stored in the tank 102 is first set as a control target value of the concentration controller 214. The concentration as the control target value may be completely the same as the target concentration of the processing liquid to be stored in the tank 102, but may be set to be slightly higher than the concentration of the processing liquid to be stored in the tank 102 in consideration of the amount of the flushing liquid (here, deionized water which is the same as the diluent) remaining in the circulation system after flushing. In this state, the procedure of steps S1 to S8 as illustrated in the flowchart of FIG. 7 is performed. After the supply of the processing liquid to the tank 102 starts m step S5, when a certain amount of the processing liquid is stored in the tank 102 (for example, when exceeding the lower limit liquid level LL), the pump 106 is operated to circulate the processing liquid in the circulation line 104. "Was the required amount of the processing liquid supplied to the tank?" in step S7 may be interpreted as "did the liquid level of the processing liquid in the tank 102 become the low liquid level L?".

When the preliminary disposal operation of step S1 is performed, it is desirable to start flow the chemical liquid to the chemical liquid line 204A after a predetermined delay time elapses from the start of the flow of the diluent to the diluent line 204B. During the delay time, checking of soundness of the densitometer may be performed.

When the step of the first supply of the processing liquid (S8) is terminated, the variable throttle valves 208A, 208B are closed and the opening/closing valve 220V is opened, using the opening/closing function, such that the processing liquid flowing in the circulation line 104 through the take-out line 220 is allowed to flow to the processing liquid supply line 210, and then, the concentration of the processing liquid in the circulation system including the tank 102 and the circulation line 104 is measured by the densitometer 212 (in a case of adopting the configuration of FIG. 2). After the measurement is terminated, the variable throttle valves 208A, 208B are opened and the opening/closing valve 220V is closed, using the opening/closing valve 220V, at an appropriate timing.

A control target value of the concentration controller 214 is determined for the second supply of the processing liquid, based on the concentration measurement result. That is, when the measured concentration is lower (higher) than the target concentration of the processing liquid to be stored in the tank 102, a concentration higher (lower) than the target concentration is set as a control target value of the concentration controller 214. The setting of the concentration target value is easily performed because the amount of the processing liquid present in the circulation system and the ratio of the processing liquid supplied by the second supply of the processing liquid are known at the present time point. The arithmetic operation of the control target value may be executed by an arithmetic operation program stored in the control device 4.

The procedure of steps S1 to S8 as described in the flowchart of FIG. 7 is performed again. It is desirable that the processing liquid circulates in the circulation line 104 at the time of the start of step S5 at the latest. "Was the required amount of the processing liquid supplied to the tank?" in step S7 may be interpreted as "did the liquid level of the processing liquid in the tank 102 become the high liquid level H?".

When the second supply of the processing liquid is terminated, the concentration of the processing liquid in the circulation system including the tank 102 and the circulation line 104 is measured by the densitometer 212 in the same manner as in the first supply of the processing liquid. When the measured concentration falls within the allowable range with respect to the target concentration, the supply operation of the processing liquid to the tank 102 is completed. Thereafter, a processing of substrates may be performed by supplying the processing liquid to the processing units 16 at any time.

For example, there may be thought a case where the amount of the flushing liquid remaining in the circulation system after flushing is considerably more than expected, and hence, the concentration of the processing liquid in the circulation system measured after the first supply of the processing liquid is drastically lower than the target concentration. In this case, it may be considered that the concentration (the control target value) of the processing liquid supplied in the second supply of the processing liquid is set to be drastically higher, and the concentration of the processing liquid in the circulation system after the second supply of the processing liquid is set to fall within the allowable range with respect to the target concentration.

However, it is undesirable to produce a processing liquid that greatly deviates from the target concentration from the viewpoint of the concentration control precision. Accordingly, an allowable range (an upper limit and a lower limit) of the control target value is set, and the control target value of the concentration controller 214 in the second (also in and after the third) supply of the processing liquid is set within the allowable range. By doing this, even after the second supply of the processing liquid is terminated, the concentration may not fall within the allowable range with respect to the processing liquid present in the circulation system in some cases.

In this case, after the second supply of the processing liquid is completed, the opening/closing valve 118V is opened, a predetermined amount of the processing liquid is discharged from the tank 102 (for example, until the liquid level in the tank 102 reaches the low liquid level L), and then, the third supply of the processing liquid is performed.

After the concentration of the processing liquid in the circulation system after the second supply of the processing liquid is measured, the control target value of the concentration controller 214 is determined for the third supply of the processing liquid in the same manner as in the second supply, and the procedure of steps S1 to S8 described in the flowchart of FIG. 7 is performed again. From the viewpoint of improving the operation efficiency of the liquid processing apparatus, it is desirable to perform the procedure up to step S5 along with the discharge of the processing liquid from the tank 102 after the second supply of the processing liquid. Further, after the third supply of the processing liquid is terminated, when the concentration of the processing liquid in the circulation system does not fall within the allowable range with respect to the target concentration, the forth or subsequent supply of the processing liquid may be performed in the same manner as in the third supply.

Figure 9:
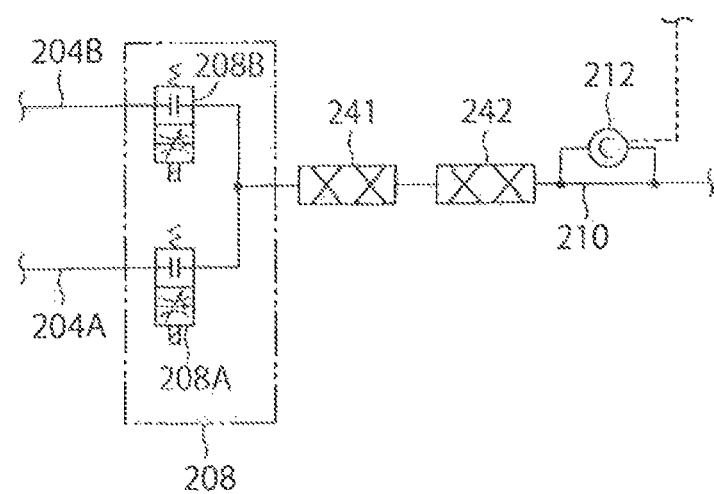
FIG. 9 is a view illustrating a modified embodiment in which an inline mixer provided at a downstream side of a mixing valve.

In the exemplary embodiment as illustrated in FIGS. 2 and 3, one or more inline mixers 241, 242 are preferably provided at a downstream side of the mixing valve 208 (specifically, a position between the joining point of the chemical liquid line 204A and the diluent line 204B, and the connecting point of the densitometer 212 to the processing liquid supply line 210), as illustrated in FIG. 9. At least one inline mixer may be a combination of a (conventional) static mixer 241 and a time-lag type mixer 242. Preferably, the static mixer 241 is provided upstream and the time-division type mixer is provided downstream. The term 'time-lag type mixer' as used herein means a type in which a fluid flowing into the mixer is branched and flowed into a plurality of flow paths having different flow path length, and joins afterwards. The term '(conventional) static mixer' means a type which does not have the configuration of the above-mentioned 'time-lag type mixer', and divides, converts and reverses the fluid flowing into the mixer. The static mixer tends to realize mixing excellent in concentration uniformity in a pipe cross-sectional direction. The time-lag type mixer tends to realize mixing excellent in concentration uniformity in a pipe axial direction. A diluted chemical liquid having high concentration uniformity in the pipe cross-sectional direction and pipe axial direction may be produced by combining a mixer having such an advantage. Since the fluctuation of the detection value of the densitometer 212 as illustrated m FIGS. 5 and 6 is relaxed by providing such an inline mixer, the determination of the supply of the processing liquid may be performed at a faster time.

Preferred exemplary embodiments of the present disclosure were described, but the present disclosure is not limited to the above-mentioned exemplary embodiments.

Figure 10:
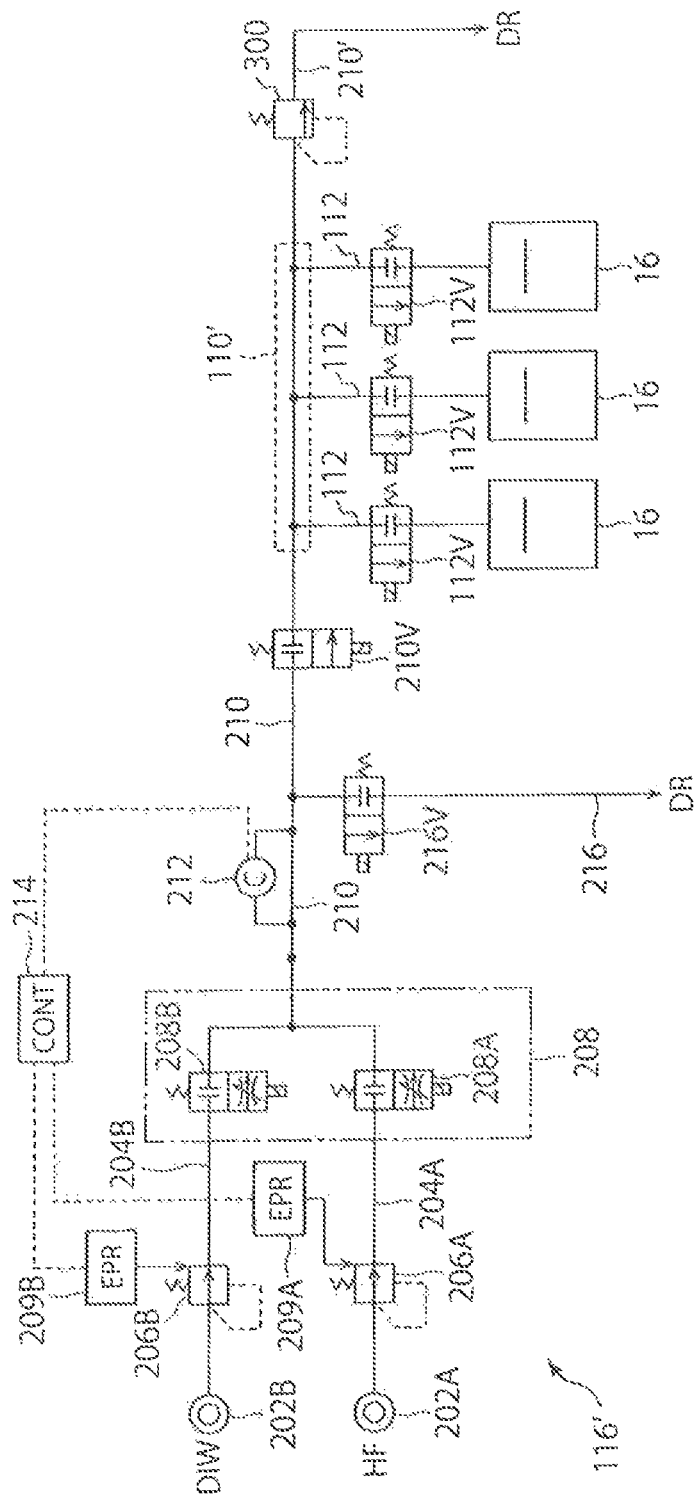
FIG. 10 is a circuit diagram illustrating an overall configuration of a liquid processing apparatus which is not provided with a tank.

In the above-mentioned exemplary embodiments, the tank liquid supplementing unit 116 supplies the processing liquid to the tank 102 connected to the processing units 16 through the circulation line 104 (that is, the processing liquid supply target site provided with the processing liquid producing mechanisms 206A, 206B, 208 is the tank 102), but the present disclosure is not limited thereto. For example, as illustrated in FIG. 10, a processing liquid supplying unit 116' having the same configuration as the tank liquid supplementing unit 116 may supply the processing liquid to the processing units 16 without a tank interposed therebetween. In the exemplary embodiment as illustrated in FIG. 10, one or more processing units 16 are connected to a connecting region 110' of the processing liquid supply line 210 through the branch line 112. The procedure of supplying the processing liquid by the processing liquid supplying unit 116' is the same as the procedure of supplying the processing liquid by the tank liquid supplementing unit 116. That is, for example, when the procedure as described in the flowchart of FIG. 7 is performed and the determination result in step S4 is Yes, the opening/closing valve 216V is closed and the opening/closing valve 210V is opened such that the preliminary disposal operation through the drain line 210 is terminated and the supply of the processing liquid to the processing units 16 is started. Substrates are subsequently introduced into the plurality of processing units 16. When the processing liquid is supplied to the substrates, each opening/closing valve 112V is opened in accordance with a processing schedule of each processing unit 16 such that the processing liquid is supplied to a corresponding processing unit 16. In this case, for example, in order to stabilize the pressure in the connecting region 110', a relief valve 300 may be provided in an end portion 210' of the processing liquid supply line 210 at a downstream side of the connecting region 110'. The preliminary disposal operation may be performed through the end portion 210' of the processing liquid supply line 210 at a downstream side of the connecting region 110' (in this case, the relief valve 300 as illustrated in FIG. 10 is not provided, or a drain line branched from the end portion 210' is provided). However, the preliminary disposal operation may be performed through the drain line 216 at an upstream side of the supply target site as in the present exemplary embodiment so that an amount of the processing liquid to be preliminarily disposed is reduced. Accordingly, the processing liquid may be supplied to substrates in a short time.

Further, for example, any device that is provided at an upstream side of the position where the densitometer 212 is provided (that is, a device constituting the processing liquid producing mechanism) may be employed as long as a concentration control is performed with a desired precision based on the detection value of the densitometer 212 without being limited to the combination of the constant-pressure valves and the variable throttle valves as illustrated in FIGS. 2 and 3. For example, a flow controller such as an LFC may be provided instead of the combination of the constant-pressure valves and the variable throttle valves.

Further, for example, in the combination of the constant-pressure valves and the variable throttle valves, flows of the raw material liquids flowing into a mixing unit may be controlled by fixing a settling of the constant-pressure valves (not changing the secondary side pressure) and adjusting the opening degree of the variable throttle valves.

Further, for example, the concentration of the processing liquid may be adjusted by adjusting the flow of the raw material liquid (DIW) in a large amount, instead of adjusting the flow of the raw material liquid (HF) in a small amount.

In the above-mentioned exemplary embodiments, the substrates to be processed in the processing units may be any substrates used in the technical field of manufacturing semiconductor devices, such as, for example, glass substrates for LCD and ceramic substrates.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A substrate liquid processing apparatus comprising:
a processing liquid mixer configured to produce a processing liquid by mixing at least two kinds of raw material liquids supplied from respective raw material liquid sources;
a liquid processing chamber configured to perform a liquid processing on a substrate using the processing liquid produced by the processing liquid mixer;
a processing liquid supply line configured to supply the processing liquid produced by the processing liquid mixer to the liquid processing chamber or a supply target site connected to the liquid processing chamber;
a drain line branched from a branching point of the processing liquid supply line and configured to discharge the processing liquid from the processing liquid supply line;
a switch configured to perform switching between a first state where the processing liquid produced by the processing liquid mixer flows in the drain line and a second state where the processing liquid produced by the processing liquid mixer is supplied to the liquid processing chamber or the supply target site;
a first concentration detector configured to measure an instantaneous concentration value of the processing liquid flowing through the processing liquid supply line; and
a controller configured to control a mixing ratio of the raw material liquids mixed by the processing liquid mixer,
wherein the controller sequentially calculates an accumulated average value of instantaneous concentration values measured by the first concentration detector, monitors the accumulated average value, and controls the processing liquid mixer such that the accumulated average value falls within a predetermined allowable range with respect to a target concentration, and
wherein, when the switch is switched from the first state to the second state, the controller subtracts a part of the instantaneous concentration values acquired before the switch is switched from the first state to the second state from the instantaneous concentration values used for calculation of the accumulated average value to be calculated after the switch is switched from the first state to the second state.

2. The substrate liquid processing apparatus of claim 1, wherein the controller controls such that the switch is set to be the second state when the accumulated average value falls within the predetermined allowable range, and the switch is set to be the first state when the accumulated average value deviates from the predetermined allowable range.

3. The substrate liquid processing apparatus of claim 1, wherein the supply target site is a tank configured to store the processing liquid, which is connected to the liquid processing chamber through a circulation line.

4. The substrate liquid processing apparatus of claim 1, wherein the processing liquid supply line includes a chemical liquid line that allows a first raw material liquid to flow therein and a diluent line that allows a second raw material liquid to flow therein,
an inline mixer is provided between a jointing point of the chemical liquid line and the diluent line, and the first concentration detector, and
the inline mixer includes a static mixer and a time-lag type mixer.

5. The substrate liquid processing apparatus of claim 4, wherein the static mixer is provided at an upstream side of the time-lag type mixer.

6. The substrate liquid processing apparatus of claim 4, further comprising a second concentration detector configured to measure a concentration of a processing liquid flowing through a circulation line.

7. The substrate liquid processing apparatus of claim 6, wherein the controller controls the first concentration detector and the second concentration detector, thereby measuring the concentration of the processing liquid flowing through the processing liquid supply line and the concentration of the processing liquid flowing through the circulation line.

* * * * *